UNITED STATES PATENT OFFICE.

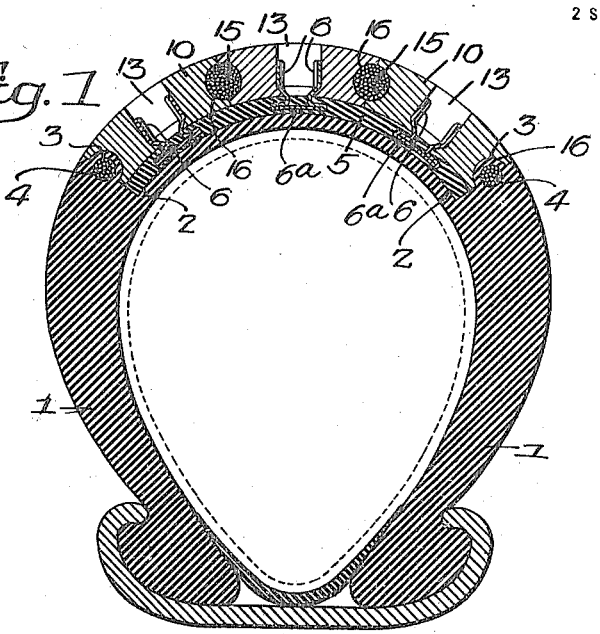
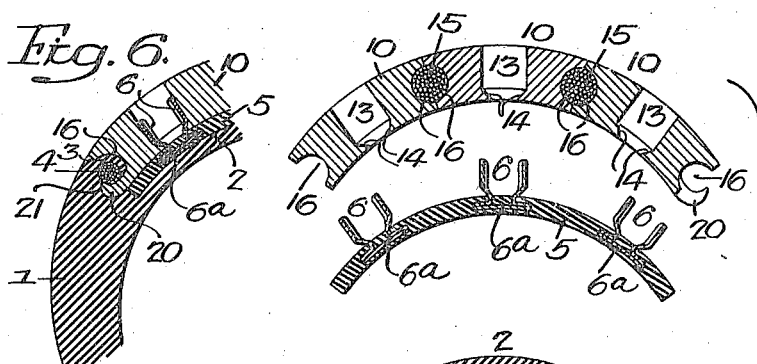
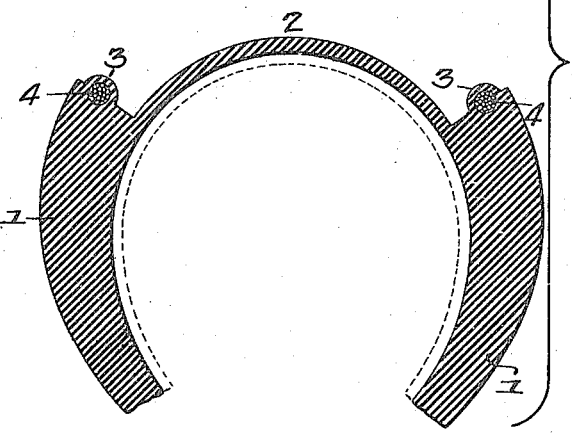

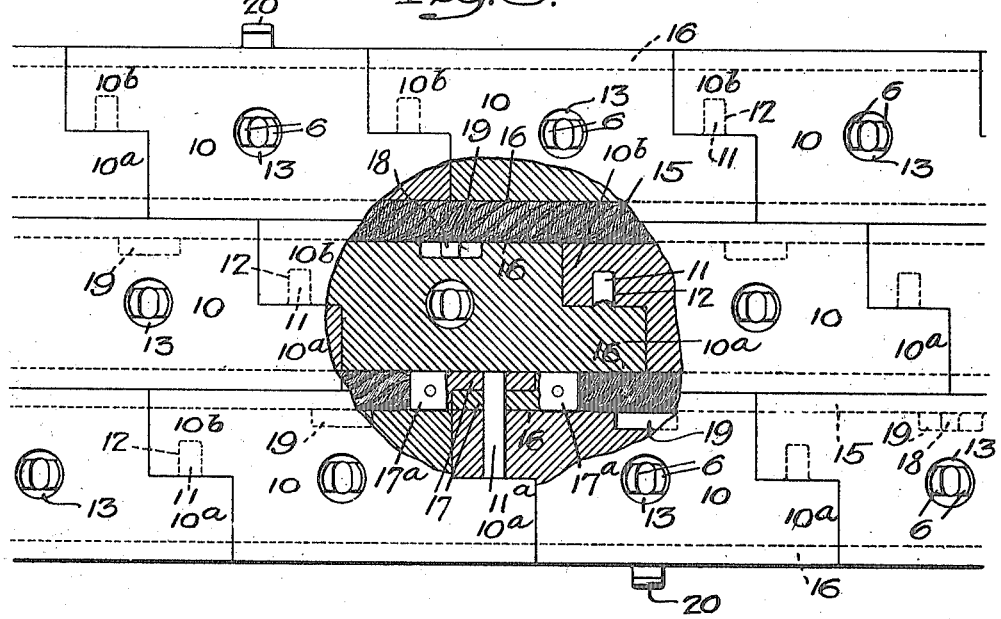
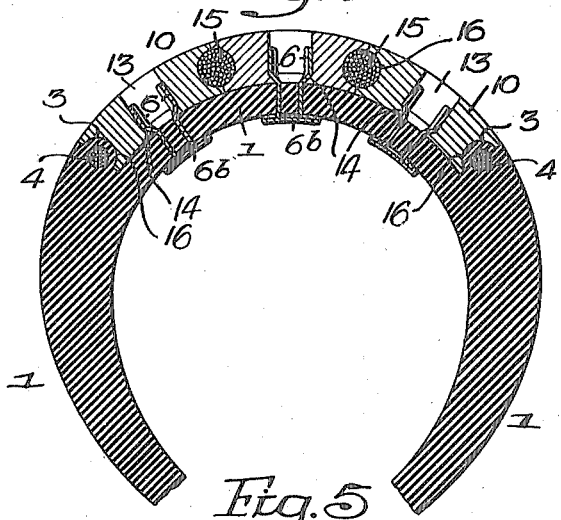

CHARLES A. GILDEMEYER, OF MINERSVILLE, PENNSYLVANIA.

AUTOMOBILE-TIRE.

1,264,500.  Specification of Letters Patent.  Patented Apr. 30, 1918.

Application filed January 9, 1915. Serial No. 1,299.

*To all whom it may concern:*

Be it known that I, CHARLES A. GILDEMEYER, a citizen of the United States, and a resident of Minersville, Schuylkill county, Pennsylvania, have invented certain Improvements in Automobile-Tires, of which the following is a specification.

My invention relates to automobile tires, and it consists of certain improvements in the outer or wear shoes of such tires; the object of my invention being to provide a built-up structure designed to have a high degree of resistance against wear and to be puncture-proof. My improved tread is made up of a plurality of interlocking, interchangeable members, which may be of any suitable wear-resisting material.

These and other features of my invention will be more fully pointed out hereinafter, reference being had to the accompanying drawings, in which:

Figure 1, is a cross sectional view of an outer tire or shoe having a tread made in accordance with my invention;

Fig. 2, is a view illustrating the tread parts of the shoe detached;

Fig. 3, is a plan view illustrating my improved tire tread extended in a single plane;

Fig. 4, is a sectional view similar to Fig. 1, illustrating a modified construction within the scope of my invention;

Fig. 5, is a sectional view on a slightly larger scale, illustrating a further modification within the scope of my invention, and Fig. 6, is a sectional view illustrating a detail of my improved construction.

In the drawings, 1 represents the outer or wear shoe of an automobile tire which in general contour is the same as ordinary wear shoes or tires; being constructed of the material usually employed: that is to say, rubberized canvas, friction cloth, sheet rubber, &c.; such shoe as made in accordance with my invention having a recess 2 on the tread portion of the same, as clearly indicated in the drawings. This recessed portion includes what may be termed the actual tread or engaging portion of the outer shoe of the tire, and is designed to receive a special form of wear-resisting armor together with means for retaining such armor in place, as more fully described hereinafter.

The side walls of the recess 2 are provided with circumferential projections or ribs 3, having within the same cores 4 made up of metal strands, which may be twisted, woven, or otherwise arranged, and these ribs with the cores are designed to afford side anchorages for the side members of the sectional armor which I employ. Fitting the lower portion of the recess is an annular strip 5 of rubberized canvas or suitable material which may be made of a number of plies and which is preferably punctureproof; being designed to be tough and sturdy but flexible, and carried by this strip are a series of spring metal prongs 6, for a purpose to be described, which prongs are shown with heads $6^a$ embedded in the strip 5.

The strip 5 is firmly secured to the wall of the tire shoe at the bottom of the circumferential recess of the same; being cemented or otherwise anchored to the body of the shoe and additionally held at the side walls of the recess by reason of the undercut portion of the same when the sections of the tread are in place. In other instances the strip may be omitted and the prongs may be passed through the wall of the shoe, as illustrated for instance in the structure shown in Fig. 4, with heads $6^b$ on the inside of the shoe, while in Fig. 5, I have shown another arrangement in which a special form of spring prong 66 is employed; being retained in a special form of socket 8 carried by a strip of material $5^a$ fitting the bottom of the recess of the tire shoe. In this construction, the socket structure 8 has a hook 9 on its under side adapted to engage a loop $9^a$ carried by the wall of the tire shoe; such wall being grooved at $9^b$ to accommodate the hook.

The armor which I provide to be carried by the tire shoe; fitting the recessed portion of the same, consists of a series of plates 10 generally oblong in outline, with end projecting portions $10^a$ and $10^b$; the projections $10^a$ having pins 11 for engagement with sockets or recesses 12 formed in the projections $10^b$. In addition, these plates are apertured at 13 to fit over the spring prongs 6 or 66 carried by the tire shoe whereby they may be retained in place in addition to the normal retention that is effected by their circumferential continuity. The walls of the apertures 13 of the sections have flanges or shoulders 14 at the bottom of the same over which the inclined portions of the spring prongs lie, and as will be understood, these prongs are capable of slight compression to permit application of the plates 10.

In order that the plates or links 10 may be further secured to the tire against dislodgment, provision is made for the application of continuous sections 15 of wire rope or cord which lie in grooves or recesses 16 at the sides or edges of the links. The meeting ends of these wire ropes or cables are provided with attaching eyes 17 formed integral with sleeves 17$^a$ which are properly secured to the ends of the wire ropes by riveting or other suitable means, and the eyes 17 fit over special pins 11$^a$ longer than the usual pins 11, which pins 11$^a$ will be carried by one of the links or plates 10. Each of the wire ropes or cords will be connected in this manner; the connections being preferably at oppositely disposed points.

The wire ropes preferably are additionally provided with lugs or projections 18 designed to enter recesses 19 formed in the edges of the plates or links at the roots of the grooves 16 in the same, and the said recesses are preferably elongated to permit any necessary movement of the wire ropes longitudinally with respect to the links when the tire is in use or in the assembly of the structure, inasmuch as difficulty would probably be experienced in effecting registry of such lugs with recesses were a snug fit designed. Furthermore, it is not necessary to provide lugs to engage all of the recesses in the links in the circumference of the tire, it being sufficient for the purpose to provide only certain of the links with such form of coöperating holding means.

Certain of the links are preferably provided with hooks 20 at the outer edges of the sectional armor, to enter recesses 21 formed in the side walls of the recessed portion 2 of the shoe and engage the stranded wire core elements 4 disposed at such point.

In the recesses left by the apertures in the links which receive the prongs carried by the continuous band secured in the circumferential recess of the tire shoe, I prefer to place a heavy grease, or a waxy body, graphite, or other similar and suitable material, which will prevent the introduction of dirt. Such filling material should preferably be of a character that will melt under the action of heat and permit removal when it becomes necessary to make repairs. It is also desirable to provide the sections with some form of lubricating material to facilitate connection of the same and prevent rusting, corrosion or the like.

In the claims I have employed the word "cords" to indicate the character of the continuous members lying between the several sets of links, and this term is to be understood as broad enough to cover the "cords," "wire ropes" and "cables," set forth in the specification.

I claim:

1. The combination, in an automobile tire, of a shoe having a continuous circumferential recess in its tread, a series of sets of detachable interconnecting links filling said recess, and continuous cords interposed between and coöperating with said sets of links to hold them to the tread, said cords being wholly inclosed by the links.

2. The combination, in an automobile tire, of a shoe having a circumferential recess in its tread, a series of sets of detachable interconnecting links filling said recesses, and continuous cords interposed between and coöperating with said sets of links to hold them to the tread; the links of each set having grooved edges for the reception of said cords, and the cords being disposed wholly below the surface of the links forming the tread.

3. The combination, in an automobile tire, of a shoe having a continuous circumferential recess in the tread thereof, reinforcing cords carried by the side walls of said recess, a sectional tread portion fitting said recess between the side walls thereof, and laterally disposed hooks carried by said sectional tread portion for engaging said reinforcing cords.

4. The combination, in an automobile tire, of a shoe having a continuous circumferential recess in the tread thereof, reinforcing means at the side walls of said recess, a tread portion made up of sets of interconnecting interchangeable links fitting said recess between the side walls thereof, and laterally disposed hooks carried by certain of said links for engaging the reinforced side walls of said recess.

5. The combination, in an automobile tire, of a shoe, a tread portion consisting of a series of detachable links, means for connecting said links together, continuous cords interposed between said links, the latter being grooved for the reception of the cords, and lugs carried by the cords for engagement with the links, the latter having recesses receiving said lugs.

6. The combination, in an automobile tire, of a shoe having a circumferential recess, a continuous band fitting said recess, hooks carried by said band, eyes carried by the tire for engagement with said hooks, prongs carried by the continuous band, detachable interconnecting links retained in place by said prongs, and hooks carried by said links for engagement with the tire.

7. The combination, in an automobile tire, of a shoe having a circumferential recess, a continuous band fitting said recess, prongs carried by the continuous band, detachable interconnecting links retained in place by said prongs, wire cords for holding said links in place, wire cords embedded in said shoe at the side walls of the recess, and hooks carried by the links for engaging said latter wire cords.

In testimony whereof, I have signed my name to this specification, in the presence of two subscribing witnesses.

CHARLES A. GILDEMEYER.

Witnesses:
JOHN DANDA,
WILTER H. C. TREZISE.

Copies of this patent may be obtained for five cents each, by addressing the "Commissioner of Patents, Washington, D. C."